US012458058B2

(12) United States Patent
Eusepi et al.

(10) Patent No.: US 12,458,058 B2
(45) Date of Patent: Nov. 4, 2025

(54) MACHINE AND METHOD FOR MAKING A CONTINUOUS TUBULAR ELEMENT WITH FILLING HAVING A SPACER AND/OR FILTER FUNCTION

(71) Applicant: G.D S.P.A., Bologna (IT)

(72) Inventors: Ivan Eusepi, Bologna (IT); Nicola Baldanza, Bologna (IT); Marco Esposti, Bologna (IT); Gennaro Rizzo, Bologna (IT); Giuliano Gamberini, Bologna (IT)

(73) Assignee: G.D S.P.A., Bologna (IT)

( * ) Notice: Subject to any disclaimer, the term of this patent is extended or adjusted under 35 U.S.C. 154(b) by 0 days.

(21) Appl. No.: 18/359,277

(22) Filed: Jul. 26, 2023

(65) Prior Publication Data

US 2023/0363442 A1 Nov. 16, 2023

Related U.S. Application Data

(62) Division of application No. 17/798,371, filed as application No. PCT/IB2021/051535 on Feb. 24, 2021, now Pat. No. 12,133,548.

(30) Foreign Application Priority Data

Feb. 26, 2020 (IT) ........................ 102020000003952

(51) Int. Cl.

*A24C 5/46* (2006.01)
*A24C 5/01* (2020.01)

(Continued)

(52) U.S. Cl.

CPC .................. *A24C 5/46* (2013.01); *A24C 5/01* (2020.01); *A24C 5/1807* (2013.01); *A24C 5/24* (2013.01);

(Continued)

(58) Field of Classification Search

CPC .... A24C 5/14; A24C 5/24; A24C 5/26; A24C 5/1807; A24C 5/01; A24C 5/46;

(Continued)

(56) References Cited

U.S. PATENT DOCUMENTS 2,145,528 A 1/1939 Ruau
2,164,702 A 7/1939 Davidson (Continued)

FOREIGN PATENT DOCUMENTS

DE 19905520 A1 8/1999
GB 311829 A 5/1929

(Continued)

OTHER PUBLICATIONS

Indonesian Office Action dated Feb. 28, 2024 from related Indonesian Patent Application No. POO202209121.

(Continued)

*Primary Examiner* — Michael H. Wilson
*Assistant Examiner* — Daniel Edward Vakili
(74) *Attorney, Agent, or Firm* — SHUTTLEWORTH & INGERSOLL, PLC; Timothy J. Klima

(57) ABSTRACT

A machine for making a continuous tubular element with filling from web material, including first and second means for feeding respective continuous webs, a forming station configured to perform a folding and/or deformation of a first continuous web in a shaped configuration, and a wrapping station wherein the second continuous web is wound in a tubular shape around the first continuous shaped web to obtain the continuous tubular element. Upstream of the wrapping station there is a first gluing device configured to apply at least one longitudinal line of glue on at least one of the continuous webs in such a way as to define at least one gluing zone, said longitudinal line of glue being positioned in such a way as to coincide with a zone of superposing and (Continued)

contact between the two continuous webs feeding out of the wrapping station.

5 Claims, 6 Drawing Sheets

(51) Int. Cl.
*A24C 5/18* (2006.01)
*A24C 5/24* (2006.01)
*A24D 3/02* (2006.01)
*B31C 5/00* (2006.01)

(52) U.S. Cl.
CPC ............ *A24C 5/465* (2013.01); *A24D 3/0245* (2013.01); *B31C 5/00* (2013.01)

(58) Field of Classification Search
CPC ........ A24C 5/465; A24C 5/00; A24D 3/0229; A24D 3/0245
See application file for complete search history.

(56) References Cited

U.S. PATENT DOCUMENTS

| | | | | |
|---|---|---|---|---|
| 2,221,443 | A | 11/1940 | Davidson | |
| 2,849,932 | A | 9/1958 | Marogg | |
| 3,482,488 | A | 12/1969 | Sexstone | |
| 4,184,412 | A | 1/1980 | Hall | |
| 4,185,645 | A | 1/1980 | Boegli | |
| 4,541,826 | A * | 9/1985 | Warner | A24D 3/0225 493/47 |
| 4,770,193 | A | 9/1988 | Pryor | |
| 5,169,481 | A | 12/1992 | Braunshteyn et al. | |
| 6,723,033 | B1 | 4/2004 | Scott | |
| 2009/0032033 | A1 | 2/2009 | Straight | |
| 2011/0034309 | A1 | 2/2011 | Eusepi | |
| 2013/0085052 | A1 | 4/2013 | Novak, III | |
| 2017/0332694 | A1 | 11/2017 | Sanna | |
| 2021/0368856 | A1 | 12/2021 | Sirani Fornasini | |
| 2021/0392946 | A1 | 12/2021 | Giannini | |
| 2023/0063849 | A1 | 3/2023 | Eusepi | |

FOREIGN PATENT DOCUMENTS

| | | | | |
|---|---|---|---|---|
| GB | 453172 | A | 9/1936 | |
| GB | 1538452 | A | 1/1979 | |
| GB | 2014427 | A | 8/1979 | |
| GB | 2171168 | A | 8/1986 | |
| JP | 2018121628 | A | 8/2018 | |
| WO | WO-2019158313 | A1 * | 8/2019 | A24C 5/1807 |

OTHER PUBLICATIONS

International Search Report and Written Opinion dated May 10, 2021 from related International Patent Application No. PCT/IB2021/051529.

Ivan Eusepi et al.—U.S. Appl. No. 17/798,140, filed Aug. 8, 2022.

International Search Report and Written Opinion dated May 19, 2021 from counterpart International Patent Application No. PCT/IB2021/051535.

* cited by examiner

Fig.4A
Fig.4
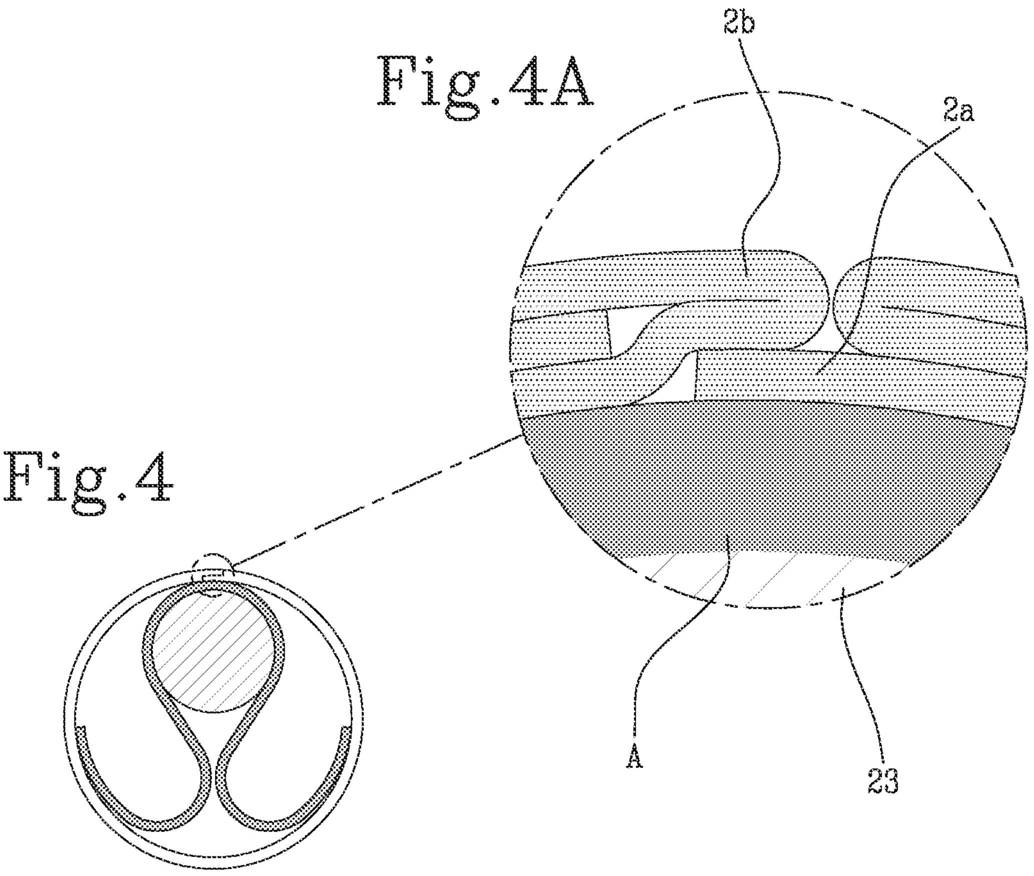
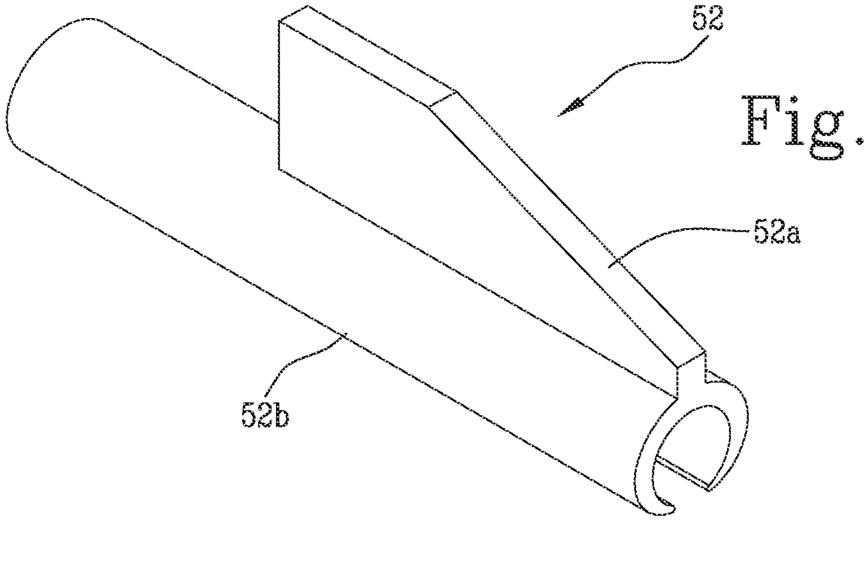
Fig.5

MACHINE AND METHOD FOR MAKING A CONTINUOUS TUBULAR ELEMENT WITH FILLING HAVING A SPACER AND/OR FILTER FUNCTION

This application is divisional of U.S. application Ser. No. 17/798,371 filed Aug. 9, 2022, which is a National Phase of International Application PCT/IB2021/051535 filed Feb. 24, 2021 which designated the U.S.

TECHNICAL FIELD

The invention relates to a machine and a method for making a continuous tubular element from web material, in particular paper-based material, formed by the outer tubular element and a filling obtained from a material in the form of a web.

More specifically, the continuous tubular element obtained in the context of this invention may be used (after cutting) to form a succession of segments (for example, filtration, spacers or cooling means) suitable for use in cigarettes or aerosol generators with a spacer, filter and/or cooling function.

BACKGROUND ART

A prior art hand-made cigarette consists of a paper tube rolled around a paper filling in the form of an insert or obtained using a piece of the selfsame paper.

In a manual method for making the tube, an outer sheet of paper material is rolled into the shape of a tube and a filling insert (normally made of a piece of paper folded manually) is then placed inside the outer tube to partly fill the cavity defined by the outer tube.

These cigarettes, made basically using ready-cut paper sheets, are very convenient to make by hand but do not lend themselves to industrial production for evident reasons of incompatibility with the production processes, in particular on account of the very low productivity attainable by working separate sheets. Working on the inserts individually is, indeed, highly time-consuming and, what is more, does not allow repeatability of the quality of the result.

There are also prior art machines which are able to produce a continuous tubular element comprising an outer tubular element and an internal filling obtained by the shaping of a web which is also continuous. In these machines, the inner web undergoes a shaping operation in such a way as to form the insert and then a wrapping operation wherein the outer web wraps the insert in such a way as to obtain the continuous tubular element.

Disadvantageously, the above-mentioned machines have some problems relating to the step of joining the two continuous webs.

More specifically, in order to wrap the filling insert in the outer web, the prior art machines require that the filling insert fills the tubular element completely. In other words, after being collected in a tubular shape, the transversal cross-section of the filling insert must be substantially the same as that of the continuous tubular element to be obtained. This is limiting in terms of the types of products which can be obtained.

This situation may also prevent the insert from performing the cooling and/or filtering action correctly.

Aim of the Invention

In this context, the technical purpose which forms the basis of the invention is to provide a machine and a method for making a continuous tubular element which overcomes the above-mentioned drawbacks of the prior art.

More specifically, the aim of the invention is to provide a machine and a method for making a continuous tubular element with filling having a spacer and/or filter function which allow a desired shape stability of the end product to be obtained, regardless of the shape of the inner insert.

The technical purpose indicated and the aim specified are substantially achieved by a machine and a method for making a continuous tubular element with filling and having a spacer and/or filter function with technical features as described here.

BRIEF DESCRIPTION OF THE DRAWINGS

Further features and advantages of the present invention are more apparent in the detailed description below, with reference to a preferred, but non-exclusive embodiment of a machine and a method continuous tubular element with filling having a spacer and/or filter function, as illustrated in the accompanying drawings, in which:

FIGS. 3A-3L show a succession of cross-section views of the machine of FIGS. 1 and/or FIG. 2 referred to corresponding cross-section lines identified in FIGS. 1 and 2;

FIG. 4 shows a cross-section of a continuous tubular element obtained using the machine of FIG. 2;

FIG. 4A shows an enlarged detail of the view of FIG. 4;

FIG. 5 is a perspective view of a component of a station of the machine of FIG. 1 or FIG. 2;

DETAILED DESCRIPTION OF PREFERRED EMBODIMENTS OF THE INVENTION

Figure 1:
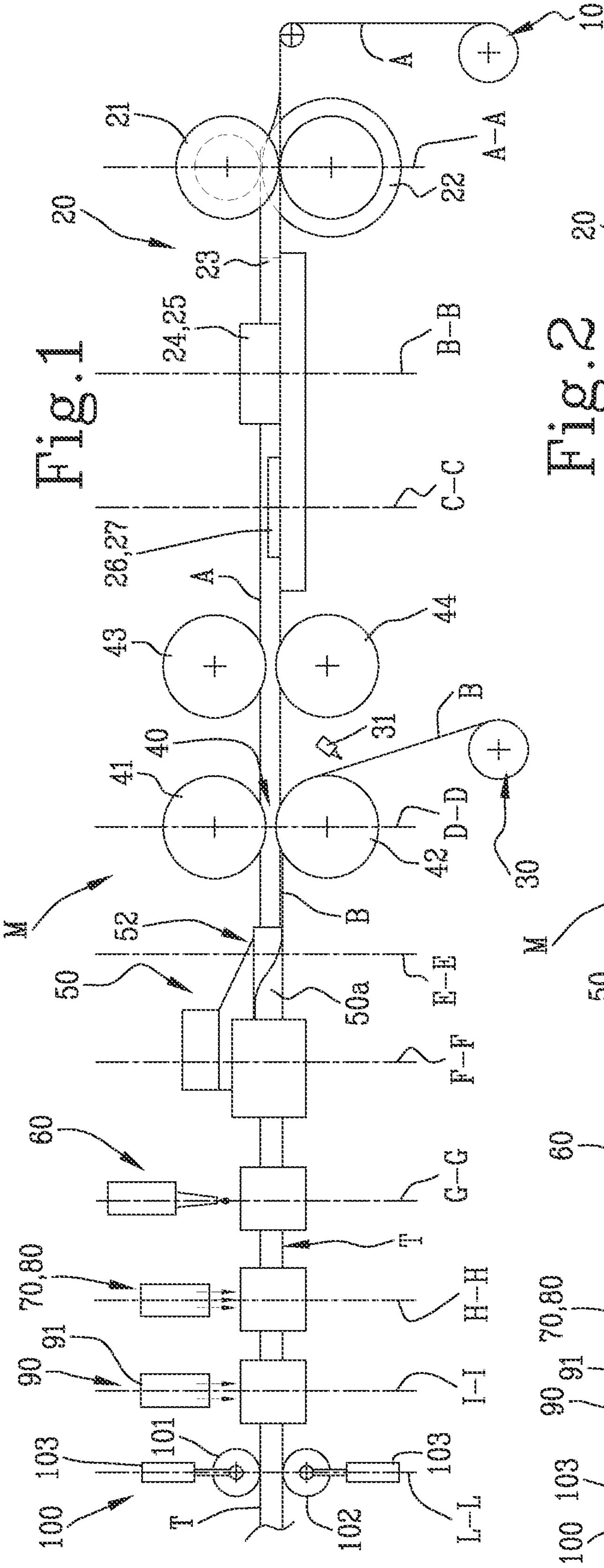
FIG. 1 shows a schematic view of an embodiment of a machine for making a continuous tubular element from a web material according to the invention.
Figure 2:
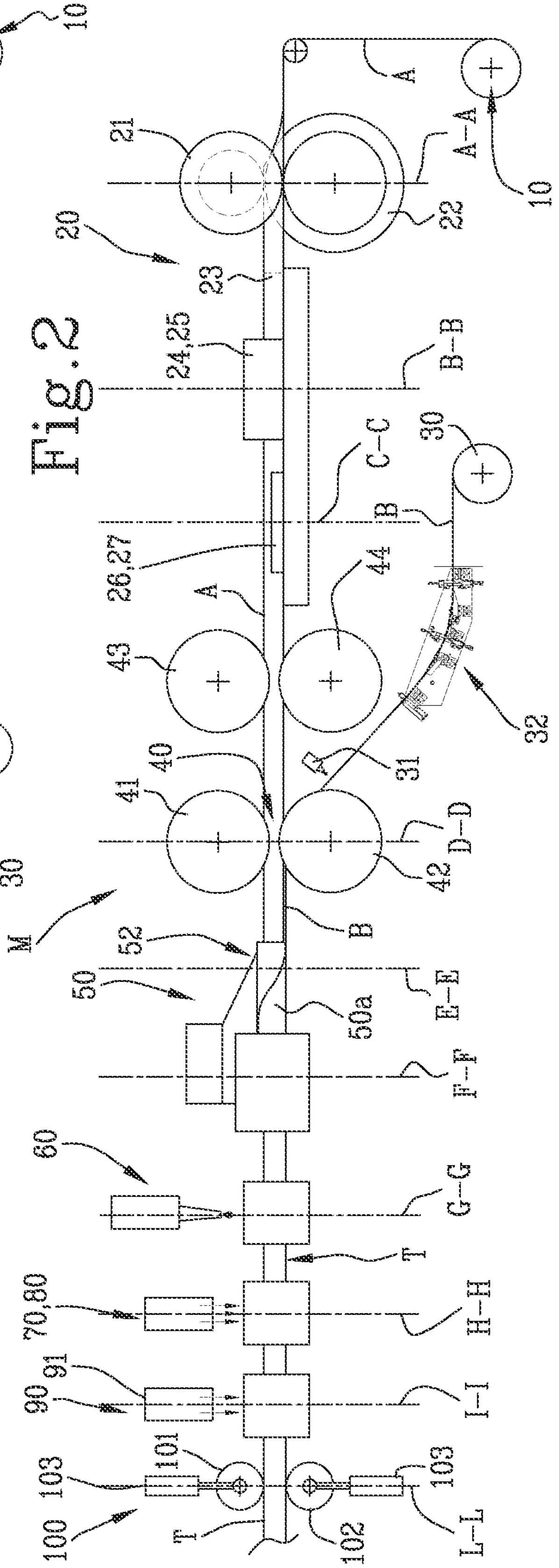
FIG. 2 is a schematic view of a variant embodiment of the machine of FIG. 1.

With reference to FIGS. 1 and 2, the reference label “M” denotes a machine for making a continuous tubular element “T” according to the invention, obtained from two continuous webs preferably made of paper. More specifically, the continuous tubular element “T” has an insert or filling made from a first suitably shaped continuous web “A” and an outer cover made by wrapping a second continuous web “B” around the first, previously shaped continuous web “A”.

In the preferred embodiment, the first and second continuous webs “A”, “B” are made of paper material. However, the materials used may be different without altering the inventive concept of the invention, even though they are made with reduced thickness to have an adequate flexibility and bending.

More specifically, for one or both of the continuous webs, a different material might be used, selected from the following materials (individually or mixed together):

- materials derived from cellulose: for example cellulose acetate (tow);
- tobacco, reconstituted tobacco (recon) or other materials of plant origin: for example, wheat, maize, sugar cane, hemp, sugar beet, palm, pawpaw;
- polymeric plastic materials: for example, polylactic acid (PLA), polyethylene (PE), polypropylene (PP), polyvinylchloride (PVC), polyethylene terephthalate (PET);

biodegradable or compostable materials, such as the following bio-plastics: Mater-Bi, PHAs (polyhydroxyalkanoates);

metals: for example aluminium, stainless steel.

These materials may also contain:

plasticizers, solvents or humectants: for example, triacetin (glycerin triacetate), TEC (triethyl citrate), PEG 400 (low molecular weight polyethylene glycol);

materials which in turn generate vapours, fumes or aerosols: for example, water, glycerol, propylene glycol;

natural or artificial flavours such as, for example, menthol, fruit extracts, sugars, liquorice, liqueur flavourings, cocoa;

materials having a selective or adsorbent filtering effect: for example, activated carbons, silica-gel;

materials that facilitate joining the web components by gluing: typically, PVA, plant- or animal-derived glue, starches, alginates, fats;

The above materials may be present simultaneously in the web of the tube or of the insert or they may be chemically mixed or mechanically joined, for example by rolling, pressing, moulding, compression, extrusion, coating, impregnation, sintering, gluing, powder or granule or wire inclusion.

The web can be made using methods similar to those used for preparing paper or recon tobacco or plastic tapes (for example, pressing) or it might also be a mesh, a textile or a non-woven web.

The machine "M" comprises first means 10 for feeding the first continuous web "A" configured to feed the first continuous web "A" along a first feed path and second means 30 for feeding the second continuous web "B" configured to feed the second continuous web "B" along a second feed path. Preferably, the first and second feed means 10, 30 comprise respective reels from which the continuous webs "A", "B" are progressively unwound and suitable guide rollers positioned along the feed paths.

The machines of FIGS. 1 and 2 are identical in the majority of their features and differ exclusively in that in the machine of FIG. 1 the second continuous web "B" (defining the outer tubular element) keeps its thickness unchanged from the respective reel to the end of the processing process, and in particular adopts a single layer configuration, whilst in the machine of FIG. 2 the second continuous web "B" is subjected to double folding along respective longitudinal lines for adopting (prior to the tubular shape) a tri-layer configuration.

For this purpose, the machine "M" comprises a folding unit 32 configured for folding longitudinal bands of the second continuous web "B" about respective longitudinal fold lines, in particular in such a way as to obtain a tri-layer web wherein the lateral edges 2*a*, 2*b* have, respectively, a lowered zone 2*a* and a prominent joining zone 2*b* (illustrated in FIG. 4A) designed to favour a closing of the continuous tubular element "T" as described in detail below.

As described above, the remaining part of the machine "M" remains identical for both the embodiments of FIGS. 1 and 2.

The machine "M" also comprises a forming station (20) positioned on the first feed path and configured to perform a folding and/or a deformation of the first continuous web "A" in a shaped configuration wherein the first continuous web "A" receives a predetermined shape, in particular three-dimensional and/or curved, in section transversal to the first feed path. In the context of this invention the specific shaping does not limit the invention, since it may be any but not circular. The accompanying drawings, however, illustrate a non-limiting example embodiment.

More in detail, the forming station 20 comprises a pair of pre-forming rollers 21, 22 having outer profiles which are shaped to match each other (therefore geometrically engaged to form a slit with a preferably constant thickness) and defining between them a gap through which the first continuous web "A" is fed to undergo a first permanent forming during the rotation of the pre-forming rollers 21, 22.

Figure 3A:
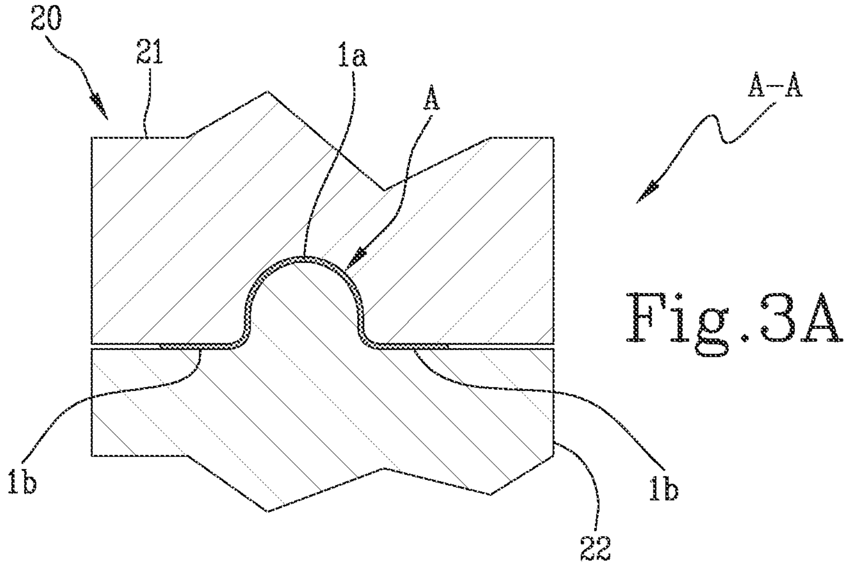

In the embodiment illustrated in FIG. 3A, the pre-forming rollers 21, 22 have, in a cross-section made in a plane passing through their axes, respective profiles shaped to match comprising a substantially semi-circular stretch interposed between two straight stretches.

In this embodiment, the pre-forming rollers 21, 22 give the first continuous web "A" a first permanent forming having, in a transversal cross-section, a central portion 1*a* substantially in the shape of an upturned "U" and two flat lateral portions 1*b*.

In a further possible embodiment, the profiles of the pre-forming rollers 21, 22 may be formed by a succession of curved stretches and in particular by a spline in such a way as to make shapes which have different undulated stretches.

In a further possible embodiment, the profiles of the pre-forming rollers 21, 22 may be defined by straight stretches alternated with curved portions or spline in such a way as to give the first continuous web "A" any shaping.

Figure 7:
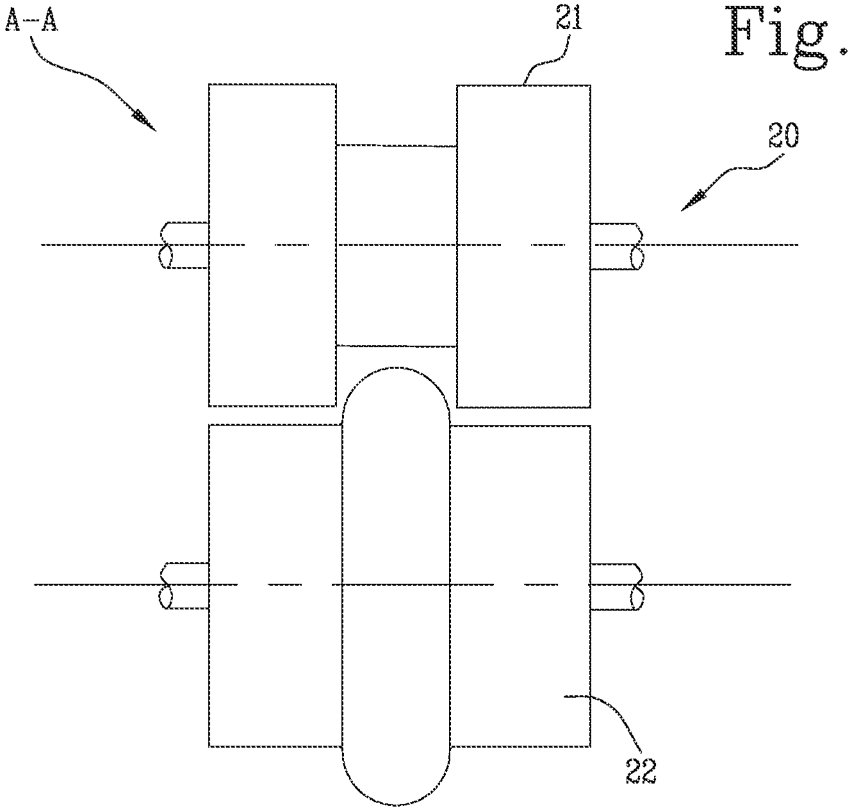
FIG. 7 shows a variant embodiment of the detail of FIG. 3A.

In a different embodiment, according to FIG. 7, the pre-forming rollers 21, 22 have outer profiles shaped in such a way as to form a slit with a non-constant thickness, that is to say, in any case having a protrusion-recess coupling but without a shape correspondence.

Downstream of the pre-forming rollers 21, 22, the machine "M" comprises a guide bar 23 about which the first continuous web "A" is at least partly formed and/or guided. The guide bar 23 therefore forms a core around which the first pre-shaped continuous web "A" is fed.

Advantageously, thanks to the presence of the guide bar 23 undesired deformations and/or folds of the first continuous web "A" are avoided, for example preventing the first continuous web "A" from deforming relative to the shaped configuration obtained during the first forming step.

The guide bar 23 is fixed, at the back, to a frame of the machine "M" close to or at the forming station 20 and extends longitudinally along the first feed path.

Preferably, the guide bar 23 is made as a rod-like body having a constant and full transversal cross-section.

Even more preferably, the outer surface of the guide bar 23 is smooth in such a way as to prevent jolting of the first continuous web "A" during its sliding/forming about the guide bar 23.

In the embodiment illustrated in the accompanying drawings, the machine M comprises a single guide bar 23 having a substantially circular cross-section in such a way as to support the central portion 1*a* of the first continuous web "A" in the shaped configuration according to the first forming.

According to a further embodiment wherein the pre-forming rollers 21, 22 apply a first forming on the first continuous web "A" which is different to that shown in the accompanying drawings, the machine "M" could comprise two or more guide bars 23 which are parallel and/or side by side or otherwise positioned and about which respective portions of the first continuous web "A" are at least partly formed and/or guided. In that case, the guide bars 23 might also have a cross-section which is different in shape from the circular shape, in particular a shape compatible with the matching imparted by the pre-forming rollers 21, 22.

Figure 6:
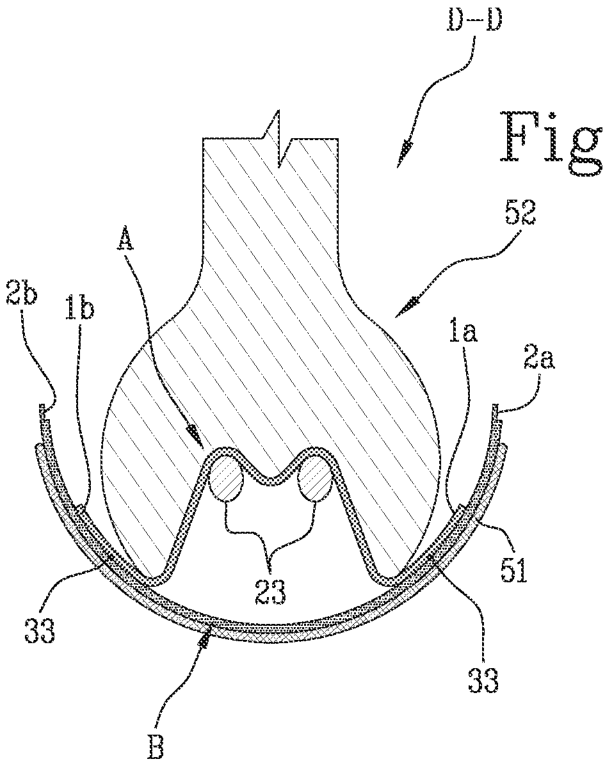
FIG. 6 shows a variant embodiment of the detail of FIG. 3E.

An example of a different arrangement of the guide bars 23 and of a different matching shape imparted by the pre-forming rollers 21, 22 is illustrated in FIG. 6 where two guide bars 23 are positioned parallel to each other in such a way as to receive the first continuous web “A” substantially M-shaped.

Operatively, at the outfeed from the pre-forming rollers 21, 22, the first continuous web “A” is fitted on the guide bar 23 in such a way that the pre-shaped (central) portion 1*a* of the first continuous web “A” rests on the guide bar 23 wrapping round it at least partly.

Downstream of the pair of pre-forming rollers 21, 22, in order to prevent an elastic return of the first continuous web “A”, the guide bar 23 may act in conjunction with a pair of guide elements 24, 25 made, for example, in the form of metal bars or blocks extending parallel to the first feed path.

Figure 3B:
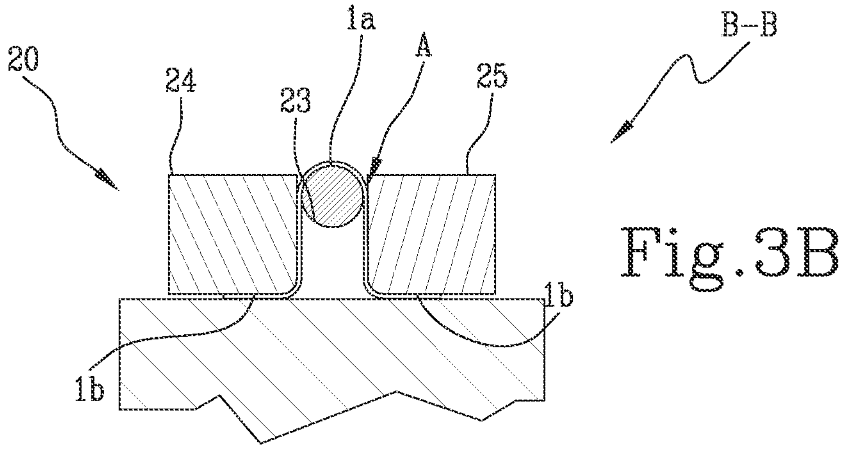

As illustrated in FIG. 3B, the pair of guide elements 24, 25 delimits a gap for the passage of the first continuous web “A” in such a way that longitudinal portions of the first continuous web “A” slide substantially in contact with a respective guide element 24, 25.

The pair of guide elements 24, 25 thus defines a passage with fixed width such as to keep the first continuous web “A” in the configuration adopted after the first forming, preventing the relative longitudinal portions from being moved away from each other, for example on account of an elastic return of the material of the first continuous web “A”.

Downstream of the pre-forming rollers 21, 22 and downstream of the guide elements 24, 25 (where present), the forming station 20 also comprises a pair of forming elements 26, 27 opposite each other and acting in conjunction with the guide bar 23 to produce a second permanent forming of the first continuous web “A”.

Preferably, the forming elements 26, 27 comprise two fixed folding units defined by respective plates pivoted to the frame of the machine “M” and having respective folding edges 26*a*, 27*a* converging and configured to move towards each other and permanently deform respective longitudinal portions of the first continuous web “A”.

Figure 3C:
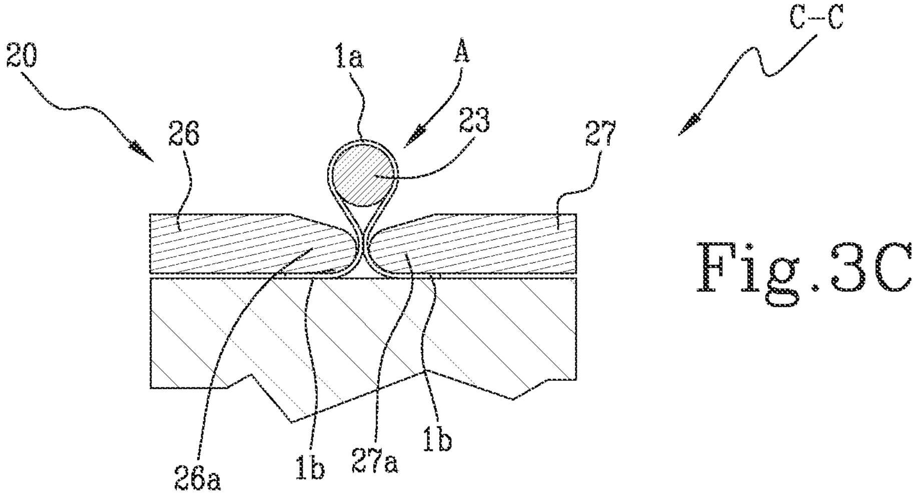

In the embodiment illustrated in FIG. 3C, the forming elements 26, 27 push towards each other the longitudinal portions of the first continuous web “A” in such a way that the transversal cross-section of the first continuous web “A” adopts a substantially “omega” shape (“(”). More specifically, during the passage of the first continuous web “A” between the forming elements 26, 27, the flat lateral portions 1*b* move towards each other whilst the central portion 1*a* is curved in such a way as to wrap further around the guide bar 23.

The forming station 20 allows continuous forming of the first web “A” in such a way that as it feeds out of the station the first continuous web “A” is shaped and ready to be introduced as an insert into the continuous tubular element “T”.

The forming process which causes the first continuous web “A” to adopt the shaped configuration is accomplished by gradual folding and/or wrapping of the first continuous web “A” around the guide bar 23 in which there are, respectively, a first step, wherein the first permanent forming is imparted by the pre-forming rollers 21, 22, and a second step in which the second permanent forming is performed by means of the forming elements 26, 27.

According to variant embodiments not illustrated, the forming station 20 might be configured to perform only one of the above-mentioned pre-forming and forming operations and, therefore, it might have only one of the respective forming means (more specifically, only one between the pair of pre-forming rollers 21, 22 and the pair of forming elements 26, 27).

According to an embodiment not illustrated, the machine M may comprise a sensor, for example optical, located downstream of the pre-forming rollers 21, 22 for detecting any failure in the first continuous web “A” and/or for controlling the centring of the first continuous web “A” downstream of said pre-forming rollers 21, 22. Substantially, the sensor is positioned for detecting the first continuous web “A” at one end of the guide bar 23. The machine M may also comprise a control unit which receives the data measured by the sensor and, based on this data, controls (by feedback) the first feed means 10.

As shown in FIGS. 1 and 2, downstream of the forming station 20, the machine M comprises a superposing zone 40 wherein the first and second feed paths are joined to each other in such a way that some portions of the first continuous web “A” are superposed with respective portions of the second continuous web “B”.

Advantageously, this superposing occurs at pre-glued zones of the first and/or the second continuous web “A”, “B”. More specifically, the gluing is preferably made on the second continuous web “B” upstream of the superposing zone.

In order to perform the gluing of the continuous webs “A”, “B”, the machine “M” comprises a first gluing device 31 positioned upstream of the superposing zone 40 along the first and/or the second feed path and configured for applying at least one longitudinal line of glue 33 respectively on the first and/or on the second continuous web “A”, “B”.

In the case of the embodiment illustrated in the accompanying drawings, the first gluing device 31 is located along the second feed path in such a way as to apply the glue line 33 along the second continuous web “B”.

The position of each of the longitudinal lines of glue 33 defines respective gluing zones on which portions of the first continuous web “A” are applied in such a way that the continuous tubular element “T” has separate contact lines and/or surfaces extending longitudinally (along the tubular element “T”), between the continuous webs “A”, “B”. In other words, the number and/or the arrangement of these longitudinal lines of glue 33 is selected in such a way that they correspond to respective separate superposing zones between the two continuous webs “A”, “B”. The term “discrete” means longitudinal lines or surfaces which are laterally separate and/or spaced from each other.

Preferably, the first gluing device 31 is adjustable at least in a relative lateral position, in particular perpendicular to the second feed path, to allow an adaptation of the longitudinal lines of glue 33 in the case of a size changeover.

In the embodiment illustrated in the accompanying drawings, the gluing device 31 comprises two dispensing nozzles and applies to the second continuous web “B” two longitudinal (and parallel) lines of glue 33 in such a way as to define two gluing zones designed to receive the flat lateral portions 1*b* of the first continuous web “A” shaped in the form of an “Q”. In this situation, the second continuous web “B” is in a flat configuration and is positioned below the first continuous web “A” in such a way as to subsequently come into contact with at least a part of the flat lateral portions 1*b* to define the separate contact surfaces between the webs “A”, “B” present inside the continuous tubular web “T”. It will be understood that the number of nozzles of the gluing device 31 may vary according to the number of longitudinal lines to be made.

In a further possible embodiment not illustrated, the first gluing device 31 is located upstream of the superposing zone 40, preferably along the first feed path and still more preferably downstream of the forming station 20, in such a way as to apply longitudinal lines of glue 33 on the first continuous web "A". More specifically, in this embodiment, the longitudinal lines of glue 33 are applied on a part of the lateral portions 1*b* of the first continuous web "A" in such a way as to define two gluing zones designed to receive respective portions of the second continuous web "B".

In order to prevent, during the gluing step, the first continuous web "A" from being folded and/or deformed such as to modify the shaped configuration, the guide bar 23 also extends through the superposing zone 40 in such a way that it is inserted between the first continuous web "A" and the second continuous web "B".

In the embodiment illustrated, there is a first pair of rollers 41, 42 located at the superposing zone 40. More specifically, the lower roller 42 of the pair of rollers 41, 42 drives a guide belt 51 of the forming beam 50*a* of a wrapping station 50 which is described in more detail below. The roller 42 has a substantially smooth lateral surface. The second continuous web "B" is fed along the second feed path until the roller 42 is partly wound (in contact with the guide belt 51) so as to pass from the superposing zone 40 to the wrapping station 50.

The upper roller 41 of the pair of rollers 41, 42 is shaped to allow the guide bar 23 and the shaped continuous web "A" to pass through it. Preferably, the upper roller 41 is made of rubber. More specifically, the outer lateral surface of the roller 41 is rubberised.

The first pair of rollers 41, 42 act in conjunction with the guide bar 23 in such a way as to keep the first continuous web "A" in the shaped configuration, preventing a flattening of the first web "A" during gluing on the second continuous web "B".

The machine M may also comprise a second pair of rollers 43, 44 which are located upstream of the superposing zone 40 along the first conveying path. This second pair of rollers 43, 44 acts on the first pre-shaped continuous web "A" and keeps the longitudinal portions of the first continuous web "A" at least partly wound around the guide bar 23 whilst the guide bar 23 prevents a flattening of the central portion 1*a* of the first continuous web "A", thus facilitating maintaining the shaped configuration. Further, the second pair of rollers 43, 44 contribute to the unwrapping and tensioning of the first continuous web "A" in the forming zone 20.

Downstream of the superposing zone 40, the machine "M" comprises a wrapping station 50 wherein the second continuous web "B" is wound around the first pre-shaped continuous web "A", until it adopts a closed tubular shape, in particular with a circular cross-section. More specifically, the superposing zone 40 is at the infeed of the wrapping station 50 in such a way that the second continuous web "B" can be positioned between the roller 42 and the above-mentioned guide belt 51.

Figure 3D:
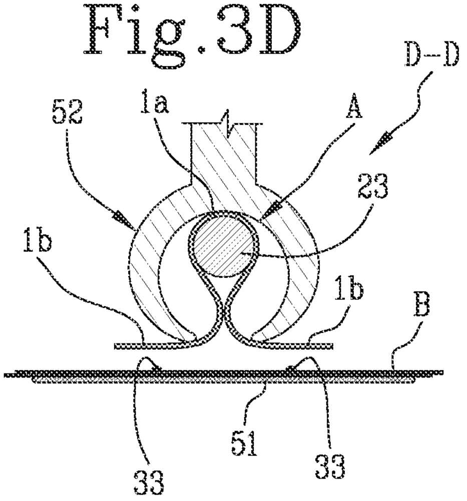
Figure 3E:
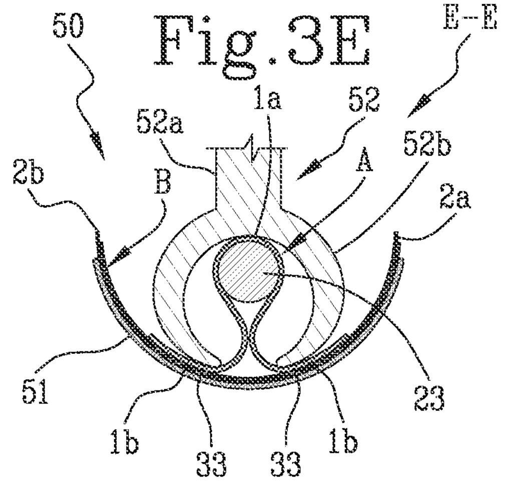
Figure 3F:
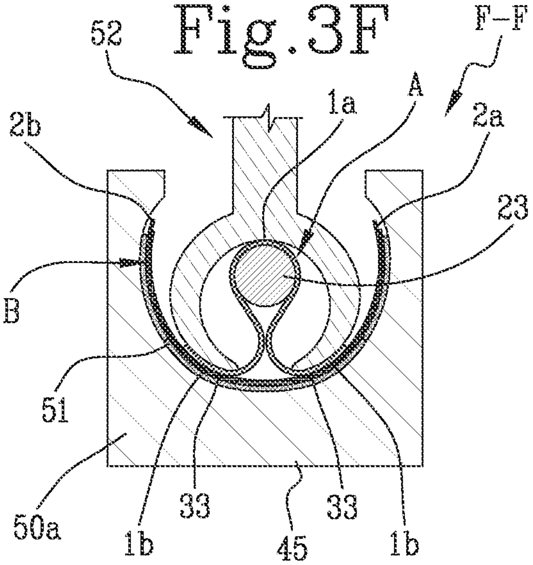

As illustrated in FIGS. 3E and 3F, the wrapping station 50 comprises a forming beam 50*a* configured for progressively wrapping the second continuous web "B" around the first continuous web "A" in a shaped configuration, preferably by using a guide and folding belt 51 for the second continuous web "B".

Advantageously, the guide bar 23 extends up to the wrapping station 50 and, in particular, until the second continuous web "B" is completely wound around the first pre-shaped continuous web "A".

The wrapping station 50 also comprises a fixed shaped body 52 which, at least for a stretch of the wrapping station 50, is interposed between the guide bar 23 and the forming beam 50*a* to form a contact for folding the second continuous web "B" around the first pre-shaped continuous web "A". More specifically, the fixed shaped body 52 is configured to be positioned around the guide bar 23 by a predetermined superposing angle, preferably greater than 180° and even more preferably greater than 270°, as shown in FIGS. 3E and 3F.

The fixed shaped body 52 is shown in detail in FIG. 5, where it may be noted that it comprises a first portion 52*a*, having a supporting function, and a second portion 52*b* having a guiding and folding function.

The first portion 52*a* has a substantially plate-like shape extending vertically for anchoring to an upper supporting structure (not illustrated). For example of a trapezoidal shape. The second portion 52*b* has a cylindrical tubular shape, with an open bottom cross section, and is configured to impress a tubular shape to the second continuous web "B" during a gradual folding around an outer surface of the second portion 52*b*. The second portion 52*b* has an inner surface which faces the guide bar 23 and an outer surface around which the continuous web "B" is progressively folded.

In another embodiment, not illustrated, the second portion 52*b* of the fixed shaped body 52 may have a different shape (for example, elliptic, multi-lobed, irregular or others) depending on the shape of the guide bar 23 and therefore depending on the shape given to the first continuous web "A" in the forming station 20.

Operatively, at the outfeed from the superposing zone 40, the first continuous web "A" and the second continuous web "B" are glued at the flat lateral portions 1*b* of the first continuous web "A" and slide along the first feed path in such a way that the second continuous web "B" rests on the belt 51 whilst the first continuous web "A" is supported by the guide bar 23.

In an initial section of the wrapping station 50 (FIG. 3E), the belt 51 starts to wrap the second continuous web "B" around the outer surface of the fixed shaped body 52, in particular around the second portion 52*b*. At the same time, the first continuous web "A" in the shaped configuration is supported and guided by the guide bar 23 inside the second portion 52*b* of the shaped body 52 in such a way as to be positioned in a gap delimited by the guide bar 23 and by the shaped body 52, in particular by the inner surface of the second portion 52*b* of the shaped body 52.

In this situation, the central portion 1*a* of the first web "A" is fed inside the gap in such a way as to prevent deformations or elastic returns whilst one or more of the end flaps, represented in the accompanying drawings by the rectilinear portions 1*b*, feed outside the gap and are progressively folded around the outer surface of the shaped body 52.

More specifically, as shown in the sequence in FIGS. 3D-3F, during the progressive wrapping of the second continuous web "B", the belt 51 compresses the first continuous web "A" and the second continuous web "B" relative to each other at least at the longitudinal glue lines 33, that is to say, at the surfaces of contact between the end flaps 1*b* of the first continuous web "A" and the second continuous web "B".

In this way, as illustrated in FIG. 3F, the fixed shaped body 52 forms a supporting contact element for compressing the separate contact surfaces between the two webs "A", "B" wherein the second continuous web "B" is superposed on the end flaps 1*b*.

Advantageously, the combined action of the fixed shaped body 52 and the belt 51 guarantees that the webs "A", "B" are glued even during wrapping of the second continuous web "B" around the first "A".

The machine "M" also comprises, upstream and/or close to the wrapping station 50, a second gluing device 60 configured for applying an adhesive substance, for example glue, on the second continuous web "B" according to one or more lines preferably parallel to each other designed for closing the outer tubular element.

Figure 3G:
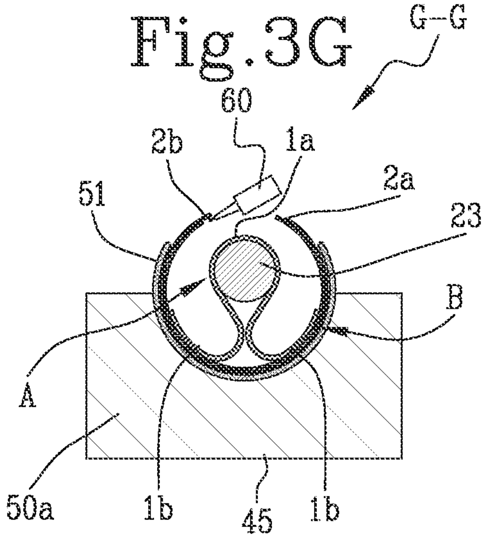

More in detail, as shown in FIG. 3G, during the progressive wrapping of the second continuous web "B", the second gluing device 60 applies at least one glue line along a lateral band 2*b* of the second continuous web "B" in such a way that, in an outfeed section of the wrapping station 50, said lateral band 2*b* of the second continuous web "B" is superposed on a further lateral band 2*a* to close the tubular element "T".

In the preferred embodiment, the second gluing device 60 applies the glue line along the prominent joining zone 2*b* in such a way that the lowered zone 2*a* can be placed over it to form a smooth continuous tubular element "T" without interruptions generated by the superposing of the lateral edges 2*a*, 2*b*. More generally speaking, the second gluing device 60 applies the glue line along the first lateral band 2*a* of the second continuous web "B" on which the second lateral band 2*b* will be superposed.

Advantageously, the second gluing device 60 allows progressive gluing of the lateral edges 2*a*, 2*b* of the second continuous web "B" during its wrapping in such a way as to deposit the glue line in a more controlled manner.

Advantageously, the second gluing device 60 allows progressive gluing of the lateral edges 2*a*, 2*b* of the second continuous web "B" minimising the rough edges of the glue line on the outer walls of the continuous tubular element "T".

Downstream of the wrapping station 50, in particular downstream of the second gluing device 60, the continuous tubular element "T" is fed by a lower support 45, preferably defining part or an extension of the forming beam 50*a* in such a way as to slide under a pressing unit 70. The presser unit 70 is configured to keep the second lateral band 2*a* superposed on the first lateral band 2*b* of the second continuous web "B" in such a way as to maintain the closing of the continuous tubular element "T".

Figure 3H:
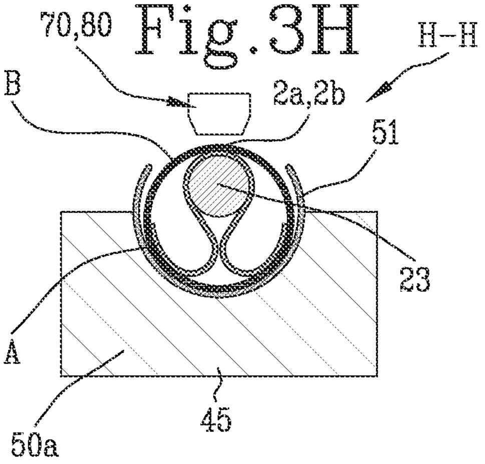

As shown in FIG. 3H, the pressing unit 70 acts as a contact element for the first and the second lateral edge 2*a*, 2*b*, preventing the risk of mutual detachment of the lateral bands 2*a*, 2*b* with consequent opening of the continuous tubular element "T".

Preferably, in order to prevent that, during the sliding of the continuous tubular element "T" beneath the pressing unit 70, the continuous tubular element "T" can be flattened such as to modify the shape of the cross-section, the guide bar 23 extends up to the pressing unit 70. In that case, the guide bar 23 acts as a supporting contact for the pressing unit 70 preventing a flattening of the transversal cross-section of the continuous tubular element "T".

As shown in FIG. 3H, the machine "M" also comprises, downstream of the wrapping station 50, and preferably downstream of the second gluing device 60, an activation device 80 configured to promote a variation of the temperature of the glue line released by the second gluing device 60.

More in detail, if the glue line is made from a glue of the "hot melt" type, the activation device 80 promotes a cooling of the glue line itself.

On the other hand, if the glue line is made from a different glue, for example from PVA glue, the activation device 80 promotes a heating of the glue line itself.

The activation device 80 is integrated the presser unit 70 in such a way as to activate the adhesive properties of the glue line and simultaneously promote and maintain the reciprocal adhesion of the lateral edges 2*a*, 2*b* of the second continuous web "B".

Advantageously, the combined action of the activation device 80 and the presser unit 70 allows a better control of the gluing process since the glue line is activated and immediately compressed between the lateral edges 2*a*, 2*b* of the second adhesive web "B" in such a way as to promote a quick drying between the lateral edges 2*a*, 2*b*.

In another possible embodiment, the activation device 80 is distinct from the presser unit 70 so that it can activate the adhesive properties of the glue line at a later stage.

The machine "M" also comprises, downstream of the wrapping station 50 and in particular downstream of or at the presser and/or activation device 70, 80, a cooling/heating station 90. In particular, similarly to what is described above with reference to the activation device 80, if the glue line is made from a glue of the "hot melt" type, the station 90 is a cooling station and cools the glue line itself. In contrast, if the glue line is made from a different glue, for example with PVA glue, the station 90 is a heating station and the selfsame glue line is heated.

The cooling/heating station 90 comprises a cooling/heating element 91 positioned facing the continuous tubular element "T" with the superposing of the lateral edges 2*a*, 2*b* of the second continuous web "B".

Figure 3I:
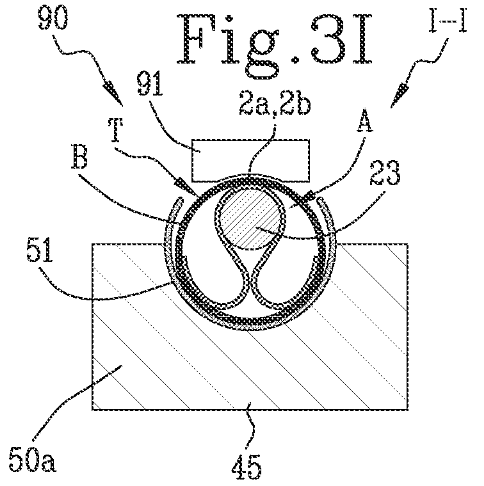
Figure 3L:
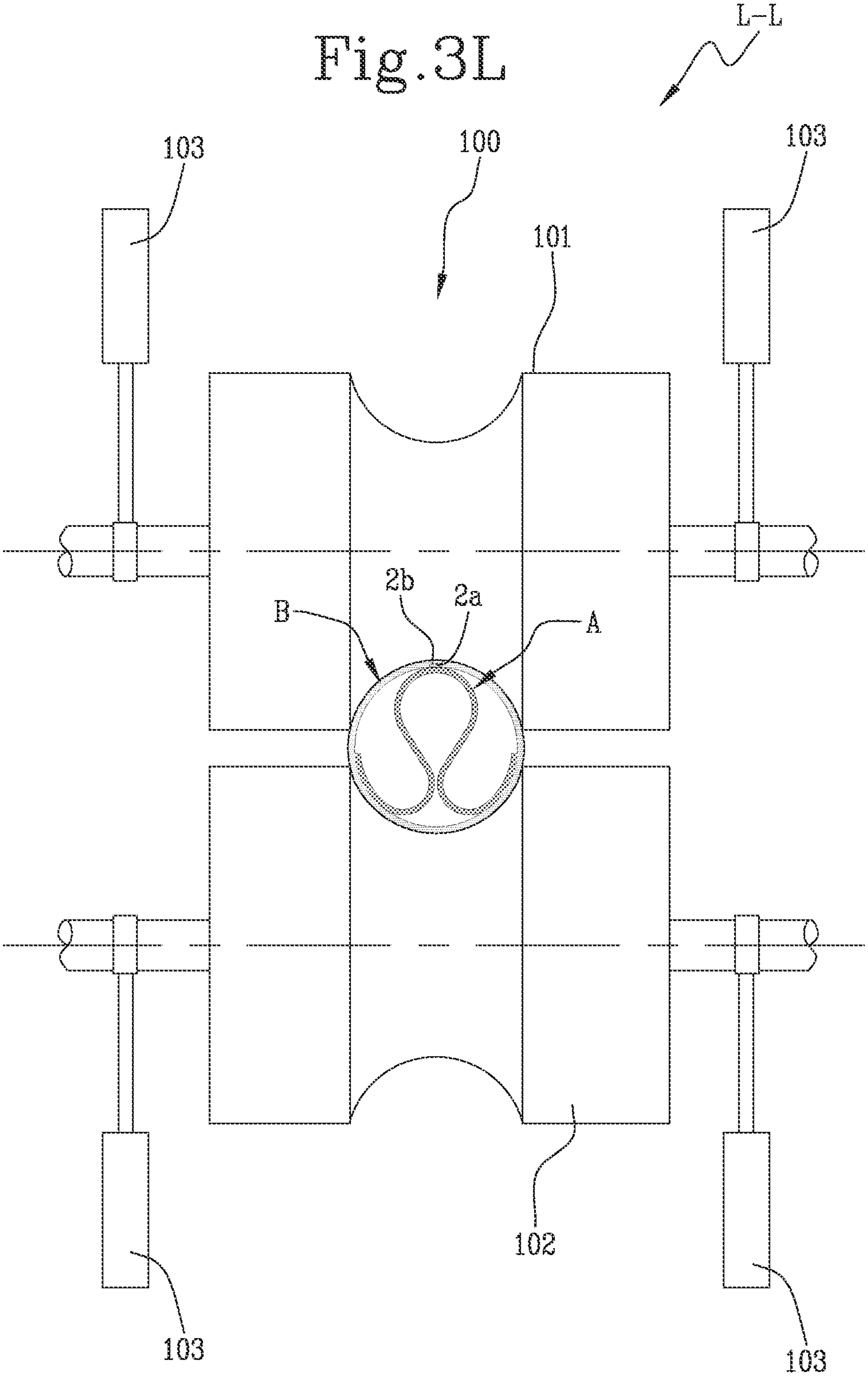

As illustrated in FIG. 3I, the cooling/heating element 91 has an integrated cooling/heating system and has the shape of a plate shaped to match the continuous tubular element "T". The plate has a concave portion with the concavity facing downwards in such a way as to face the continuous tubular element "T". More in detail, the concave portion is shaped to match the continuous tubular element "T" to be cooled/heated in such a way as to facilitate the sliding of the continuous tubular element "T" preventing the risk of it flattening in the part in contact with the plate.

Advantageously, the presence of the cooling/heating station 90 allows the fixing of the lateral bands 2*a*, 2*b* to be ensured.

Advantageously, the cooling/heating element 91 allows the glue line to dry quickly in such a way as to avoid problem linked to a possible opening of the continuous tubular element "T".

In one embodiment, the cooling/heating element 91 is made in one piece; in other words, the cooling/heating element 91 consists of a single plate shaped to match the continuous tubular element "T". In an alternative embodiment, the cooling/heating element 91 may comprise a plurality of plates shaped to match the continuous tubular element "T" and positioned one after the other.

Advantageously, the use of the plurality of plates allows optimisation of cooling/heating.

In the preferred embodiment, downstream of the wrapping station 50 and preferably downstream of the cooling/heating station 90, the machine "M" also comprises a compression device 100 configured to model the cross-section of the continuous tubular element "T".

In fact it is possible that during the steps for making the continuous tubular element "T" through the various stations of the machine "M" the continuous tubular element "T" is slightly deformed, for example flattened to adopt a slight lateral convexity.

The compression device 100 comprises a first and a second compression roller 101, 102 which face each other and have respective profiles shaped to define a gap for the passage of the continuous tubular element "T".

More specifically, the compression rollers 101, 102 are adjustable towards/away from each other preferably independently, for example by means of actuators 103, for varying a passageway for the continuous tubular element "T" in such a way as to model the cross-section of the continuous tubular element "T" according to a desired shape, in particular circular.

Preferably, the compression rollers 101, 102 are idle.

According to another aspect of the invention, the machine "M" may be followed by a device for cutting the continuous tubular element "T" into discrete tubular segments equipped with a shaped insert made using a portion of the first continuous web "A" in the shaped configuration. In this situation, the machine "M" is configured as a machine for making discrete segments.

The invention achieves the above-mentioned aims, eliminating the drawbacks highlighted in the prior art.

The first gluing device 31 is versatile and precise in the application of the longitudinal glue lines 33 in such a way as to perform a gluing of the two continuous webs "A", "B" along the discrete contact lines and/or the surfaces required inside the continuous tubular element "T".

The first gluing device 31 is also versatile in the event of a size changeover of the first continuous web "A" or of the second continuous web "B" since its position (and, if necessary, also the number of glue lines applied) is adjustable along the second feed path.

The second gluing device 60 joined to the pressing element 70 and the activation device 80 allow the gluing of the continuous tubular element "T" to be optimised.

The cooling/heating unit 91 allows the operations for making the continuous tubular element "T" to be speeded up, reducing the time relative to the drying of the glue line.

Generally speaking, the method for making the continuous tubular element "T" makes it possible to reduce the costs and the time relative to the production of the continuous tubular element "T".

The method for making the continuous tubular element "T" performed using the machine "M" is efficient and reliable, especially during the step of wrapping the second continuous web "B" around the first continuous web "A", since the maintaining of the shape of the continuous tubular element "T" and of the relative cut pieces is guaranteed over time.

The invention described above is susceptible to variants falling within the scope of the inventive concept. More specifically, the shaping of the first continuous web "A" may be any but not circular and may therefore differ from the shaping (circular) adopted by the second continuous web "B". Preferably, in a cross-section, the first continuous web "A" has a shape such that it passes transversely through the second wound continuous web "B" (that is to say, such as to cross transversally, between two or more opposite points of contact, the inner space defined by the final tubular element formed by the wrapping of the second continuous web "B").

The invention claimed is:

1. A method for making a continuous tubular element with filling having a spacer and/or filter function, comprising the following steps:

feeding at least a first continuous web along a first feed path;

feeding at least a second continuous web along at least a respective second feed path;

forming the first continuous web into a first shaped continuous web to give the first web a three-dimensional non-circular shaped configuration and/or a curved non-circular shaped configuration;

wrapping said second continuous web around said first shaped continuous web to obtain said continuous tubular element defined by a tubular covering containing said first shaped continuous web, before said wrapping step, applying to said first continuous web and/or to said second continuous web at least one longitudinal line of glue in a position corresponding to at least one zone of superposing and contact between the first and the second continuous web in said continuous tubular element;

wherein the step of forming the first continuous web into said first shaped continuous web is performed by at least partially wrapping the first continuous web around a fixed guide bar; and wherein said step of wrapping said second continuous web around said first shaped continuous web is performed whilst said first shaped continuous web is guided in a configuration at least partly wrapped on the fixed guide bar.

2. The method according to claim 1, wherein said continuous tubular element includes a plurality of separate longitudinal lines and/or longitudinal contact surfaces, separate and/or spaced from each other, between said first continuous shaped web and said second continuous wrapped web, and wherein said step of applying at least one line of glue to said first continuous web and/or second continuous web is operated at a plurality of zones of the first continuous web and/or second continuous web corresponding to at least part of said separate lines and/or contact surfaces.

3. The method according to claim 1, wherein said step of wrapping the second continuous web around the first shaped continuous web is performed using a guide belt for the second continuous web and comprises a step of making, using the guide belt, a reciprocal compression between the first shaped continuous web and the second continuous web at least at said contact lines and/or surfaces having respective lines of glue.

4. The method according to claim 1, wherein said step of wrapping the second continuous web around the first shaped continuous web is performed by depositing a further line of glue at least at a first lateral edge of the second continuous web and then superposing said first lateral edge on a second lateral edge opposite to each other of the second continuous web to define a tubular wrap; said method also comprising a subsequent step of compressing said opposite lateral edges using a pressing element whilst said opposite lateral edges are resting on an at least one guide bar.

5. The method according to claim 4, also comprising, after the compression step, a step of cooling or heating a portion of the continuous tubular element having said opposite lateral edges by a cooling/heating plate having a concave portion facing the continuous tubular element and substantially shaped to match said portion to be cooled or heated of the continuous tubular element.

* * * * *